United States Patent [19]
Rank

[11] Patent Number: 5,722,344
[45] Date of Patent: Mar. 3, 1998

[54] BIRD FEEDER WITH DRY SEED STORAGE

[76] Inventor: Lawrence R. Rank, 4307 Mt. Vernon, Swartz Creek, Mich. 48473

[21] Appl. No.: 717,241

[22] Filed: Sep. 18, 1996

[51] Int. Cl.[6] .................................................. A01K 39/01
[52] U.S. Cl. ................................... 119/57.8; 119/52.2
[58] Field of Search ................................. 119/57.8, 57.9, 119/52.2, 52.3, 429

[56] References Cited

U.S. PATENT DOCUMENTS

| | | | |
|---|---|---|---|
| D. 231,369 | 4/1974 | Kilham | 119/57.8 X |
| 3,568,641 | 3/1971 | Kilham | 119/57.8 |
| 4,541,362 | 9/1985 | Dehls | 119/57.9 |
| 4,821,681 | 4/1989 | Tucker | 119/51.01 |
| 4,829,934 | 5/1989 | Blasbalg | 119/57.8 |
| 5,062,388 | 11/1991 | Kilham | 119/52.2 |
| 5,095,847 | 3/1992 | Coffer | 119/52.2 |
| 5,207,181 | 5/1993 | Loken | 119/57.9 |
| 5,215,039 | 6/1993 | Bescherer | 119/52.2 X |
| 5,285,747 | 2/1994 | Caldine | 119/57.9 |
| 5,361,723 | 11/1994 | Burleigh | 119/52.3 |
| 5,375,558 | 12/1994 | Drakos | 119/57.9 |
| 5,445,109 | 8/1995 | Gray et al. | 119/57.9 |
| 5,479,880 | 1/1996 | Stuhr | 119/57.8 |

*Primary Examiner*—Gene Mancene
*Assistant Examiner*—Yvonne R. Abbott
*Attorney, Agent, or Firm*—Learman & McCulloch

[57] ABSTRACT

The bird feeder has an elongated tubs with a removable plug and a screen in the bottom. A bore through the elongated tube receives a first horizontal tube. The tube has a slot that provides communication with the seed storage compartment. End surfaces of the tube extend upward and outwardly from the wall of the elongated tube. A perch is supported by the elongated tube below each end of the horizontal tube.

12 Claims, 2 Drawing Sheets

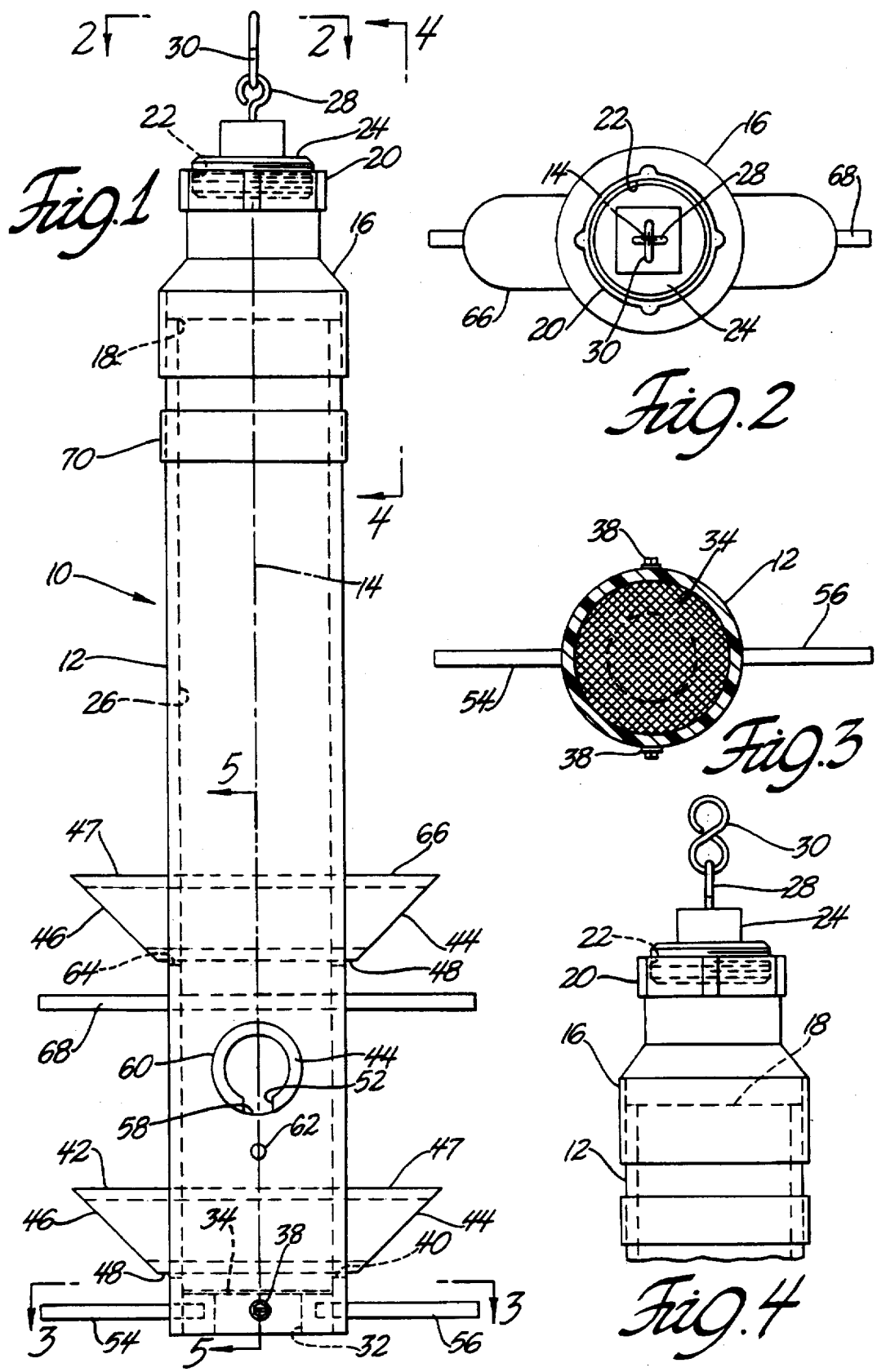

BIRD FEEDER WITH DRY SEED STORAGE

TECHNICAL FIELD

This invention is in a bird feeder and more particularly in a bird feeder that protects the seed from moisture and limits access based on the physical size of birds.

BACKGROUND OF THE INVENTION

Bird feeders that are currently available tend to allow some water into the seed storage compartment. Once water is inside the seed storage compartment, it is retained and soaks into the seed. Wet seed will then begin to sprout in a few days if the temperature is sufficiently high. These seed sprouts will not flow toward the feed openings where they can be reached by birds.

Molds and other fungus growths may form on wet grain. Toxins are secreted by some of these growths. Many birds refuse to eat grain that becomes moldy. Other birds that do consume moldy grain and the secreted toxins may become sick or even die.

Moldy grain tends to cake and stick to inside surfaces of a bird feeder. These clumps of grain tend to draw and soak up water and to cause bird feeders made from wood to rot. The removal of moldy grain that is stuck to the inside walls of a bird feeder is a time consuming and difficult task especially if the feeder has a small access opening. Scraping and brushing will not remove toxins and mold spores from the surfaces of any container. Chemical disinfectants are required and they may not be successful.

Many systems have been tried to limit access to bird feeders. Some of these systems employ the weight of a large bird or other animal to close an access port to seed inside the feeder. These systems are subject to mechanical problems. System based on weight are also generally incapable of keeping small birds from feeding.

SUMMARY OF THE INVENTION

An object of the invention is to provide a bird feeder that reduces the possible entry of water into the seed storage compartment. Another object of the invention is to provide a drain in the bottom of a seed storage compartment that will allow water to drain out and will permit air circulation to dry seed if water does wet the seed. A further object of the invention is to provide a bird feeder which will allow birds to feed or keep birds and other animals out based on their physical size.

The bird feeder has an elongated plastic tube with a central axis that is generally vertical. A water tight access plug closes the top of the generally vertical tube. A screen is provided in the bottom of the vertical tube to let liquid out and to permit limited air circulation to dry seed.

At least one horizontal circular bore passes through the vertical tube near the bottom of the seed storage compartment. A horizontal tube is inserted through the bore. The ends of the horizontal tube extend outside the vertical bore. Both ends of the horizontal tube are cut at acute angles relative to the horizontal axis of the tube. The portions of the tube that extend furthest from the outside of the vertical tube are placed on top. The horizontal tube is held in place by an adhesive that creates a seal between the walls of the horizontal and vertical tubes. A slot in the bottom wall of the horizontal tube provides access to seed inside the vertical tube. Seed in the seed storage compartment above the horizontal tube flows around the sides of the horizontal tube and up to the slot in the bottom wall. A dowel below the bottom of the horizontal tube supports a bird while it sticks its head inside the horizontal tube and takes seed through the slot through the bottom wall. The size bird that can take seed from the feeder is controlled by the size of the horizontal tube and the location of the dowel relative to the horizontal tube. Birds that are too large or too small cannot get their heads into the horizontal tube. Animals such as squirrels cannot get their heads inside the tube even if they can support themselves on the outside of the vertical tube adjacent to an end of the horizontal tube.

BRIEF DESCRIPTION OF THE DRAWING

The presently preferred embodiment of the invention is disclosed in the following description and in the accompanying drawings, wherein:

FIG. 1 is an elevational view of the bird feeder;

FIG. 2 is a top view taken along line 2—2 in FIG. 1 showing only one horizontal feeding tube;

FIG. 3 is a sectional view taken along line 3—3 in FIG. 1;

FIG. 4 is a side view taken along line 4—4 in FIG. 1 with parts broken away.

DESCRIPTION OF THE PREFERRED EMBODIMENT

Figure 5:
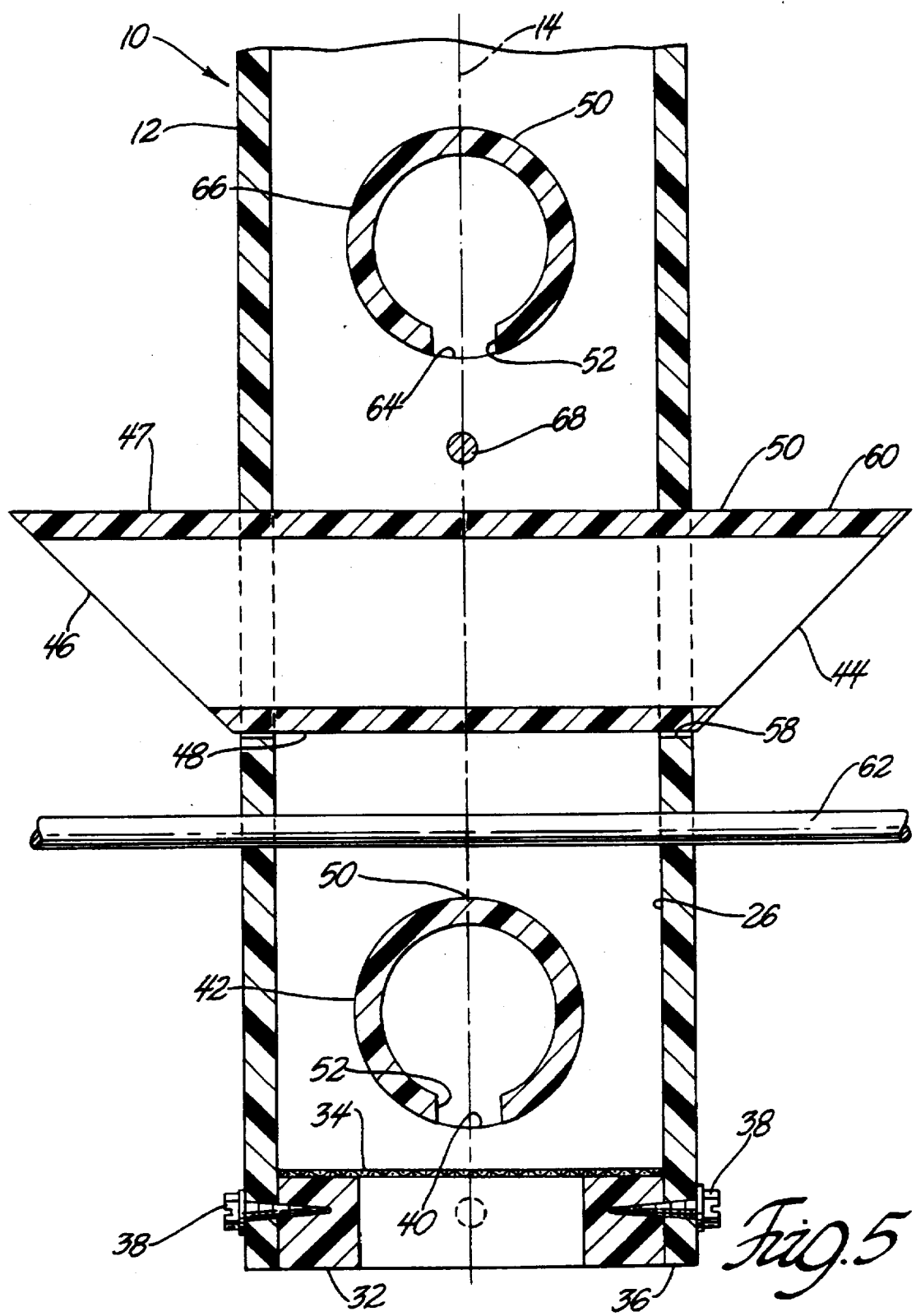
FIG. 5 is an enlarged sectional view taken along line 5—5 in FIG. 1.

The bird feeder 10 is constructed from standard plastic pipe made from polyvinyl chloride or another suitable plastic. An elongated tube 12, with a central axis 14 that is generally vertical, forms the seed container portion of the feeder 10. The elongated tube 12 as shown in the drawing is round. However, the elongated tube 12 could be oval, square, rectangular, hexagonal or any other desired shape. An inside diameter of three inches works well but could be larger or even a little smaller if desired.

A reducer coupling 16 is secured to the upper end 18 of the elongated vertical tube 12 by an adhesive. A threaded plug adapter 20 with a threader bore 22 is attached to the upper end of the coupling 16. Threaded plug 24 screws into the bore 22 to close the seed storage compartment 26. Seed is added to the compartment 26 by removing the plug 24, pouring seed into the compartment and then screwing the plug back into the adapter 20 to form a water tight closure.

A threaded eye bolt 28 is screwed into the top of the threaded plug 24. A figure eight link 30 is attached to the eye bolt 28. Chain, rope or another connector is attached to the link 30 and to a tree or other support to suspend the bird feeder 10 from a support structure. The bird feeder 10 can also be supported from below on a pole or other suitable structure if desired.

A washer member 32 with a fine screen 34 attached is inserted in the bottom end 36 of the vertical tube 12 and held in place by screws 38. Screws 38 are used rather than adhesives so that the washer member 32 and the attached screen 34 can be removed from the elongated tube 12 for cleaning.

A bore 40, perpendicular to the vertical axis 14, passes through the vertical tube 12 near the bottom of the seed compartment 26. The first horizontal tube 42 has end surfaces 44 and 46 that extend downwardly and inwardly at an acute angle from the upper horizontal edge 47 of the tube as shown in FIG. 1. The short bottom portion 48 of the fixed horizontal tube 42 is slightly longer than the outside diameter of the vertical tube 12 at the point where the horizontal tube extends through the vertical tube. The longer top portion 50 of the first horizontal tube 42 is substantially longer than the short bottom portion 48 and extends outward past the outside surfaces of the vertical tube 12. A slot 52 is cut into the short bottom portion 48 of the first horizontal tube 42. Adhesive is applied to the surfaces of the bore 40 to hold the first horizontal tube 42 in place and to form a water tight seal between the tube and the bore. A tight seal is insured by providing a bore 40 that is a little smaller than the outside diameter of the first horizontal tube 42, compressing the tube after the slot 52 is cut through the wall, inserting the tube through the bore 40 and then releasing the tube to expand into a tight contact with the surfaces of the bore. Dowels 54 and 56 are then inserted into bores through the walls of the vertical tube 12 and into the washer member 32 below and parallel to the first tube 42. These dowels 54 and 56 are below the tube 42 and serve as perches for birds eating from the feeder 10. Both dowels 54 and 56 are held in position by friction. The friction fit allows the dowels 54 and 56 to be removed when the washer 32 and the screen 34 need to be removed for cleaning.

A second bore 58 is formed through the vertical tube 12 above the bore 40. The second bore 58 is perpendicular to the vertical axis 14. As shown in the drawing, the second bore 58 is also perpendicular to the bore 40. A second horizontal tube 60, identical to the first horizontal tube 42, is secured in the second bore 58 in the same way the first tube 42 is secured in the first bore 40. The same reference numbers are used for the second horizontal tube 60 as were used for the first tube 42 because the two tubes are essentially identical. A dowel 62 passes through the vertical tube 12 below and parallel to the second horizontal tube 60. Friction can hold the dowel 62 in place or an adhesive can be used.

A third bore 64 through the vertical tube 12 is formed above the second bore 58 and parallel to the first bore 40. A third horizontal tube 66, identical to the first and second horizontal tubes 2 and 60, is secured in the third bore in the same manner that the first horizontal tube is secured in the first bore. A dowel 68 passes through the vertical tube 12 below and parallel to the third horizontal tube 66. Friction or adhesive holds the dowel 68 in place.

The distance between the dowels 54, 56, 62 or 68 and the adjacent higher parallel first, second or third horizontal tubes 42, 60 or 66 determines the size birds that can feed. A bird that is too large cannot stand or perch on one of the dowels and get its head in the horizontal tube above the dowel. A bird that is too small cannot stand on one of the dowels and reach the horizontal tube above the dowel. The dowels 54, 56, 62 and 68 can be moved up and down as desired by drilling new holes and plugging the old holes. First, second and third horizontal tubes 42, 60 and 66 can be chosen with an inside diameter that limits access to seed by large birds and other animals. An inside tube diameter of about one and one half inches will accommodate many small birds. The lengths of the horizontal tubes 42, 60 and 66 are varied as required if the vertical tube is conical or the required tube length varies for some other reason.

The first horizontal tube 42 is spaced above the screen 34 a distance sufficient to permit seeds to flow freely down along both sides of the tube and under the bottom of the tube. Some seeds that flow well will flow up to the slot 52. Birds may have to stick their beaks down through the slot 52 to obtain seeds that do not flow well. The second horizontal tube 60 is spaced about the first tube 42 a sufficient distance to permit the desired placement of the dowel 62. The third and subsequent horizontal tubes 66 and dowels are spaced above the lower tubes as required to accommodate birds of the desired size. It would be possible if desired to have some horizontal tubes and perches spaced for large birds, other spaced for medium sized birds and others spaced for small birds. Any number of horizontal tubes 42 can be used. One horizontal tube 42 is sufficient if there are a small number of birds to be fed and the bird seed is to last a relatively long time. A substantial number of horizontal tubes may be used if large numbers of birds are to be fed.

As described above, the second horizontal tube 60 is perpendicular to the first and third horizontal tubes 42 and 66. This 90° change from one horizontal tube to the next can be changed as desired. The horizontal tubes 42, 60 and 66 could even be parallel to each other if desired.

The round surface of each horizontal tube and the downwardly and inwardly inclined end surfaces 44 and 46 tend to direct water away from the slot 52 and keep the seed storage compartment 26 dry. However, wind may blow rain or snow into the horizontal tubes 42, 60 and 66 and some water may pass through slots 52 and into the compartment 26. This water will tend to run to the bottom of the compartment and out through the screen 34. Unfortunately when moisture passes through one of the slots 52 some seeds below that slot will get wet. Heat generated in the compartment 26 by the sun and other sources and air passing through the horizontal tubes 42, 60 and 66 will at time create a temperature differential that will cause air to rise, pull more air through the screen 34 and slowly dry wet grain in the seed storage compartment 26.

The band 70 shown in FIG. 1 is decorative. It is also a high friction strip for holding the tube 12 while the plug 24 is removed for filling the compartment 26 with seed.

The disclosed embodiment is representative of a presently preferred form of the invention, but is intended to be illustrative rather than definitive thereof The invention is defined in the claims.

I claim:

1. A bird feeder comprising an upright container forming a seed storage compartment and having an access lid that can be opened and closed; a generally horizontal bore through the upright container; a generally horizontal tube mounted in the generally horizontal bore and passing through the seed storage compartment and open to the outside at both a first end and a second end, a seed access slot through a bottom portion of the generally horizontal tube and wherein the open ends of the generally horizontal tube extend outside the upright container and have surfaces that extend downwardly and inwardly toward adjacent walls of the upright container; and a bird perch below each open end of the generally horizontal tube.

2. A bird feeder as set forth in claim 1 wherein the seed access slot extends from the first end to the second end of the generally horizontal tube.

3. A bird feeder as set forth in claim 1 wherein the bird perch is a dowel that extends outward from the generally upright container.

4. A bird feeder as set forth in claim 1 wherein the upright container includes a screen bottom portion that allows water to drain from the seed storage compartment and permits air to enter and circulate through the seed storage compartment to dry wet seeds.

5. A bird feeder comprising a generally vertical elongated tube with a top closure and a bottom closure forming a seed storage compartment, and at least one generally horizontal bore passing through the generally vertical elongated tube; a generally horizontal tube mounted in the generally horizontal bore and having a first end extending outside the generally vertical elongated tube, a center portion inside the seed storage compartment, a second end extending outside the generally vertical elongated tube, an opening through the generally horizontal tube in communication with the seed storage compartment and an end surface on the first end and the second end of the generally horizontal tube that extends downwardly and inwardly toward the generally vertical elongated tube; and a bird perch below each end of the generally horizontal tube.

6. A bird feeder as set forth in claim 5 wherein the generally horizontal tube has a passage extending from the first end to the second end.

7. A bird feeder as set forth in claim 5 wherein the opening through the generally horizontal tube is a slot through a bottom portion that extends from the first end to the second end.

8. A bird feeder as set form in claim 7 wherein the generally horizontal bore passing through the generally vertical elongated tube has a diameter that is less than the outside diameter of the generally horizontal tube mounted in the generally horizontal bore and the generally horizontal tube is deformed when it is inserted into the generally horizontal bore.

9. A bird feeder as set forth in claim 5 wherein the bottom closure includes a screen that allows water to drain form the seed storage compartment and permits air to enter and circulate through the seed storage compartment.

10. A bird feeder as set forth in claim 5 wherein the end surfaces of the generally horizontal tube extend downwardly and inwardly at an angle of 45° from a vertical plane.

11. A bird feeder as set forth in claim 5 including a plurality of horizontal bores passing through the generally vertical elongated tube; and a generally horizontal tube mounted in each of said plurality of horizontal bores.

12. A bird feeder comprising a generally vertical elongated tube with a top closure and a bottom closure forming a seed storage compartment, and a least one generally horizontal bore passing through the generally vertical elongated tube; a generally horizontal tube mounted in the generally horizontal bore and having a first end extending outside the generally vertical elongated tube, a center portion inside the seed storage compartment, a second end extending outside the generally vertical elongated tube, an opening through the generally horizontal tube in communication with the seed storage compartment and wherein the opening through the generally horizontal tube is a slot through a bottom portion that extends from the first end to the second end; a bird perch below each end of the generally horizontal tube; and wherein the generally horizontal bore passing through the generally vertical elongated tube has a diameter that is less than the outsider diameter of the generally horizontal bore and the generally horizontal tube is deformed when it is inserted into the generally horizontal bore.

\* \* \* \* \*

UNITED STATES PATENT AND TRADEMARK OFFICE
CERTIFICATE OF CORRECTION

PATENT NO.  : 5,722,344
DATED       : March 3, 1998
INVENTOR(S) : Lawrence R. Rank It is certified that error appears in the above-indentified patent and that said Letters Patent is hereby corrected as shown below:

Substitute the following Abstract for the Abstract presently of record:

-- ABSTRACT --

The bird feeder has an elongatedtube with a removable plug and a screen in the bottom. A bore through the elongated tube receives a first horizontal tube. The tube has a slot that provides communication with the seed storage compartment. End surfaces of the tube extend upward and outwardly from the wall of the elongated tube. A perch is supported by the elongated tube below each end of the horizontal tube.

Column 3, line 38, change "2" to -- 42 --.

Claim 9, line 2, change "form" to -- from --.

Signed and Sealed this

Fifth Day of May, 1998

*Attest:*

BRUCE LEHMAN

*Attesting Officer*  Commissioner of Patents and Trademarks